(12) United States Patent
Mitchell

(10) Patent No.: US 8,292,332 B2
(45) Date of Patent: Oct. 23, 2012

(54) SWIVEL CONNECTOR

(75) Inventor: David Mitchell, Carina Heights (AU)

(73) Assignee: Private Brand Tools (Australia) Pty Ltd, Queensland (AU)

( * ) Notice: Subject to any disclaimer, the term of this patent is extended or adjusted under 35 U.S.C. 154(b) by 118 days.

(21) Appl. No.: 13/006,075

(22) Filed: Jan. 13, 2011

(65) Prior Publication Data

US 2012/0181787 A1 Jul. 19, 2012

(51) Int. Cl.
*F16L 27/00* (2006.01)
(52) U.S. Cl. .......................................... 285/190; 285/273
(58) Field of Classification Search .................. 285/190, 285/191, 273
See application file for complete search history.

(56) References Cited

U.S. PATENT DOCUMENTS

| | | | | |
|---|---|---|---|---|
| 422,017 A * | 2/1890 | Harris et al. | | 285/147.3 |
| 2,845,282 A * | 7/1958 | Mueller | | 285/137.11 |
| 3,125,360 A * | 3/1964 | Ulrich | | 285/124.5 |
| 3,166,252 A * | 1/1965 | Williams et al. | | 239/587.6 |
| 3,466,062 A * | 9/1969 | Deplante | | 285/145.2 |
| 4,362,324 A * | 12/1982 | Kelly | | 285/119 |
| 4,672,998 A * | 6/1987 | Kozak, III | | 137/614.04 |
| 5,372,389 A * | 12/1994 | Tam et al. | | 285/94 |
| 5,636,877 A * | 6/1997 | Purvis et al. | | 285/45 |
| 5,803,360 A * | 9/1998 | Spitznagel | | 239/345 |
| 5,839,764 A * | 11/1998 | Heidelberger | | 285/276 |
| 6,712,292 B1 * | 3/2004 | Gosis et al. | | 239/345 |
| 7,337,990 B2 * | 3/2008 | Kurosaka et al. | | 239/587.2 |
| 7,703,814 B2 * | 4/2010 | Wei | | 285/190 |
| 2008/0238092 A1 * | 10/2008 | Chen et al. | | 285/190 |
| 2009/0146416 A1 | 6/2009 | Wei | | |

* cited by examiner

*Primary Examiner* — Aaron Dunwoody
(74) *Attorney, Agent, or Firm* — Nixon & Vanderhye P.C.

(57) ABSTRACT

A swivel connector (1) comprising a first banjo (2), a first banjo bolt assembly (3), a second banjo (4) and a second banjo bolt assembly (5). The first banjo (2) comprises a first collar (20) and a first neck (21) to which is connectable a first fluid line such as an air hose. The first banjo bolt assembly (3) comprises a first banjo bolt (30) that extends sealingly through the first collar (20) such that a threaded connector end (36) of the first banjo bolt (30) extends from the first collar (20) and the first banjo (2) can swivel/rotate about the first banjo bolt (30). The second banjo (4) comprises a second collar (40) and a second neck (3) extending laterally from a threaded opening (41) in the second collar (40), wherein the second neck (3) and the first banjo bolt assembly (3) are one and the same and the threaded connector end (36) of the first banjo bolt (30) is screwed to the threaded opening (41). The second banjo bolt assembly (5) comprises a second banjo bolt (50) that extends sealingly through the second collar (40) such that a connector end (56) of the second banjo bolt (50) extends from the second collar (40) and the second banjo (4) can swivel/rotate about the second banjo bolt (50). The connector end (56) of the second banjo bolt (50) is connectable to a second fluid line such as a pneumatic tool.

14 Claims, 4 Drawing Sheets

SWIVEL CONNECTOR

FIELD OF THE INVENTION

This invention relates to a swivel connector for connecting a first fluid line (such as an air hose) to a second fluid line (such as a pneumatic tool). In particular, the invention concerns a swivel connector comprising a first banjo, a second banjo and a first banjo assembly that is also a neck of the second banjo.

BACKGROUND OF THE INVENTION

Swivel connectors for connecting pneumatic tools to high pressure air hoses are known. One such connector is described in US Publication No. 2009/0146416 A1 to Chung-Chih Wei. That connector utilizes a ball bearing mechanism to rotatably connect female and male banjo-like parts together.

A disadvantage of that connector is that the female and male parts can lock up during operation (ie. when placed under high pressure) as they are under lateral load. Also, since the source of air can contain moisture, the ball bearing mechanism can rust and seize up.

Yet another disadvantage of that connector is that it utilizes a locking screw/pin and circlip for locking the parts together. Hence it can be tedious to assemble and disassemble.

SUMMARY OF THE INVENTION

It is an object of the present invention to provide a swivel connector which at least minimizes one of the disadvantages mentioned above.

According to the present invention, there is provided a swivel connector comprising:
a. a first banjo comprising a first collar and a first neck extending laterally from the first collar to which is connectable a first fluid line;
b. a first banjo bolt assembly comprising a first banjo bolt that extends sealingly through the first collar such that a threaded connector end of the first banjo bolt extends from the first collar and the first banjo is rotatable about the first banjo bolt;
c. a second banjo comprising a second collar and a second neck extending laterally from a threaded opening in the second collar, wherein the second neck and the first banjo bolt assembly are one and the same and the threaded connector end of the first banjo bolt is screwed to the threaded opening; and
d. a second banjo bolt assembly comprising a second banjo bolt that extends sealingly through the second collar such that a connector end of the second banjo bolt extends from the second collar and the second banjo is rotatable about the second banjo bolt, wherein the connector end of the second banjo bolt is connectable to a second fluid line such that fluid can flow within the swivel connector in a fluid-tight manner between the first and second fluid lines.

Although the swivel connector has been designed primarily for use with pneumatic tools, it is possible that the connector could be used in hydraulic applications.

The first banjo can be of any suitable size, shape and construction, and can be made of any suitable material or materials. Preferably the first banjo is made of cast metal or metal alloy. The first collar can be tubular and can have opposed ends. The first neck can be hollow and extend laterally from the first collar from between those ends. Preferably, the first collar and neck are of unitary construction, although this need not be the case. If of unitary construction then the swivel connector will be less bulky and thus usable in more confined spaces.

The shape of the first neck will depend on the nature of the first fluid line to which it is to be connected. In one embodiment, the first neck is shaped so as to be connectable to a first fluid line in the form of a hose or pipe. In this embodiment the first neck can be barbed or otherwise shaped for quick connection to a hose—ie. a quick coupling or universal coupling. In another embodiment, the first neck is threaded so as to be connectable to a first fluid line in the form of a pneumatic or hydraulic tool, such as an air ratchet. In this embodiment the first neck can be externally threaded. If desired, the first neck can comprise one or more detachable hollow threaded adaptor pieces for connection to pneumatic (or hydraulic) tools having inlets of varying diameter.

The first banjo bolt assembly can be of any suitable size, shape and construction, and can be made of any suitable material or materials. The first banjo bolt can comprise an enlarged head, a hollow shaft extending from the head, the threaded connector end, and a pair of opposed lateral openings in the shaft. Preferably the first banjo bolt is made of cast metal or metal alloy.

The first banjo bolt can extend sealingly through the first collar in any suitable way. The first banjo bolt assembly can comprise a first annular sealing member extending around an inner circumference of a first end of the first collar and a second annular sealing member extending around an inner circumference of a second end of the first collar. The sealing members can comprise rubber or plastic O-rings or gaskets, for example.

The first banjo bolt can have a first annular groove extending adjacent the head within which extends the first sealing member. Such a groove can extend between a first pair of flanges that extend from the shaft of the first bolt.

The first banjo bolt can have a second annular groove extending adjacent the threaded connector end within which extends the second sealing member. Such a groove can extend between a second pair of flanges that extend from the shaft of the first bolt.

The first banjo bolt assembly can comprise a further annular sealing member extending around the threaded connector end so as to provide a fluid-tight seal when the first bolt is screwed to the threaded opening in the second collar. Preferably the threaded connector end is externally threaded and the threaded opening in the second collar is internally threaded (eg. within a boss of the second collar). The further sealing member can comprise a rubber or plastic O-ring or gasket, for example.

The second banjo can be of any suitable size, shape and construction, and can be made of any suitable material or materials. Preferably the second banjo is made of cast metal or metal alloy.

The second collar can be tubular and can have opposed ends. As mentioned, preferably the threaded opening in the second collar is internally threaded within a boss that is located between the opposed ends of the second collar.

The second banjo bolt assembly can be of any suitable size, shape and construction, and can be made of any suitable material or materials. The second banjo bolt can comprise an enlarged head, a hollow shaft extending from the head, a connector end to which is connectable the second fluid line, and a pair of opposed lateral openings in the shaft. Preferably the second banjo bolt is made of cast metal or metal alloy.

The second banjo bolt can extend sealingly through the second collar in any suitable way. The second banjo bolt assembly can comprise a first annular sealing member extending around an inner circumference of a first end of the second collar and a second annular sealing member extending around an inner circumference of a second end of the second collar. The sealing members can comprise rubber or plastic O-rings or gaskets, for example.

The second banjo bolt can have a first annular groove extending adjacent the head within which extends the first sealing member. Such a groove can extend between a first pair of flanges that extend from the shaft of the second bolt.

The second banjo bolt can have a second annular groove extending adjacent the connector end within which extends the second sealing member. Such a groove can extend between a second pair of flanges that extend from the shaft of the second bolt.

The shape of the connector end of the second banjo bolt will depend on the nature of the second fluid line to which it is to be connected. In one embodiment, the connector end is shaped so as to be connectable to a second fluid line in the form of a hose. In this embodiment the connector end can be barbed or otherwise shaped for quick connection to a hose—ie. a quick coupling. In another embodiment, the connector end is threaded so as to be connectable to a second fluid line in the form of a pneumatic tool (such as an air ratchet). In this embodiment the connector end can be externally threaded.

Preferably, the connector end comprises a hollow threaded adaptor piece detachable from a remainder of the connector end, for connection to a second fluid line of varying diameter.

The second banjo bolt assembly can comprise a further annular sealing member extending between the detachable adaptor piece and the remainder of the connector end, so as to provide a fluid-tight seal. The further sealing member can comprise a rubber or plastic O-ring or gasket, for example.

A preferred embodiment of the invention will now be described, by way of example only, with reference to the accompanying drawings.

DETAILED DESCRIPTION OF THE PREFERRED EMBODIMENT

Figure 1:
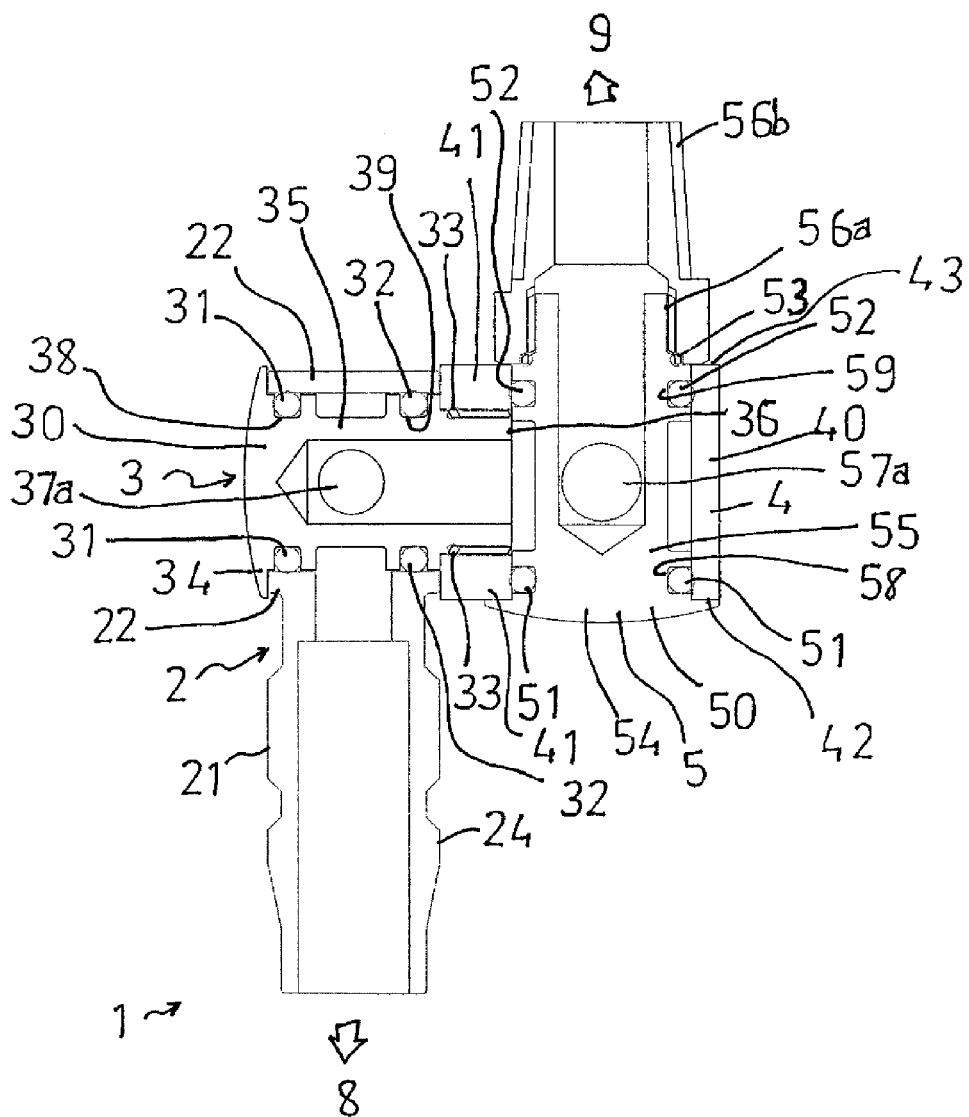
FIG. 1 is a longitudinal cross-sectional view of a swivel connector, according to an embodiment of the present invention.
Figure 2:
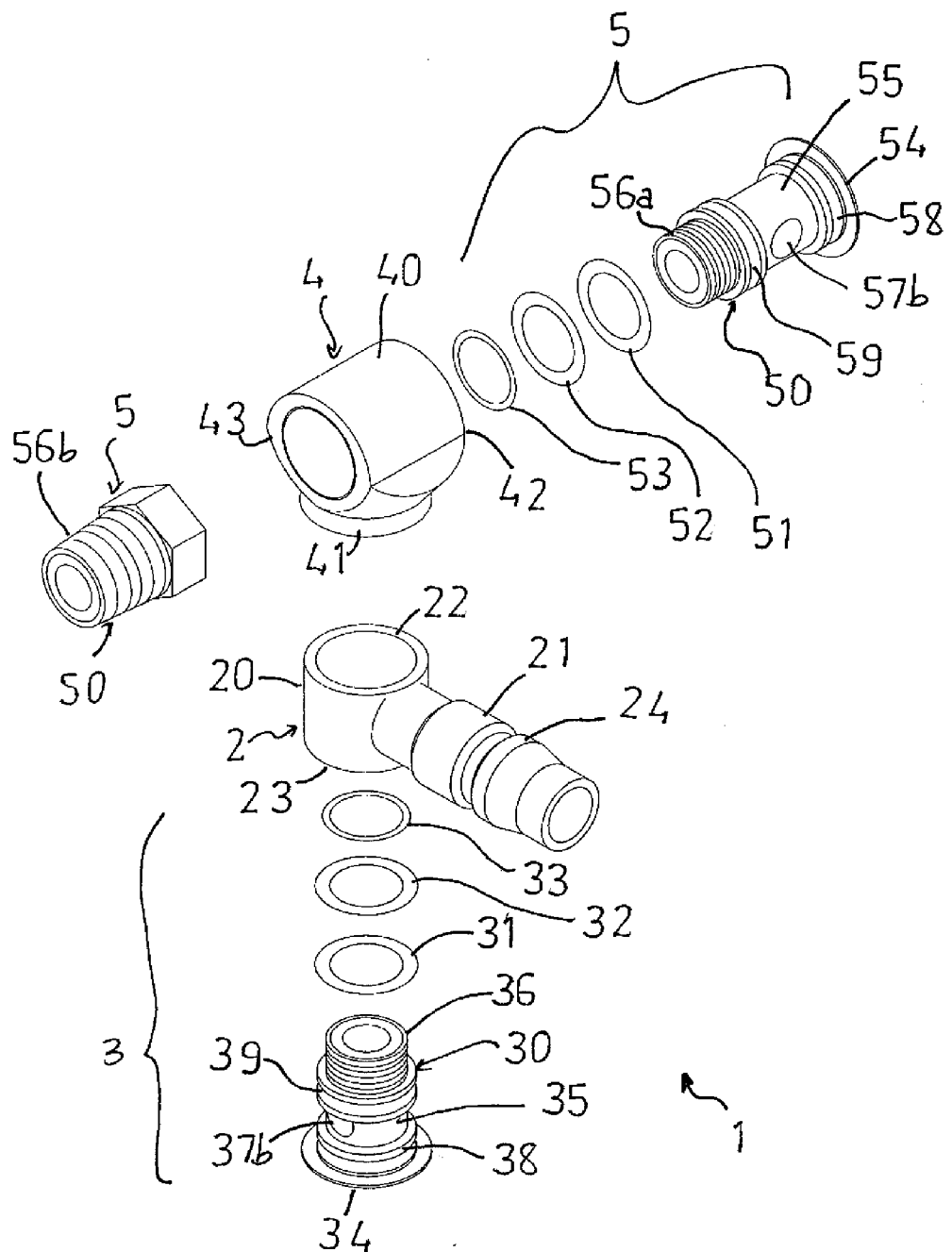
FIG. 2 is a perspective exploded view of the swivel connector shown in FIG. 1.
Figure 3:
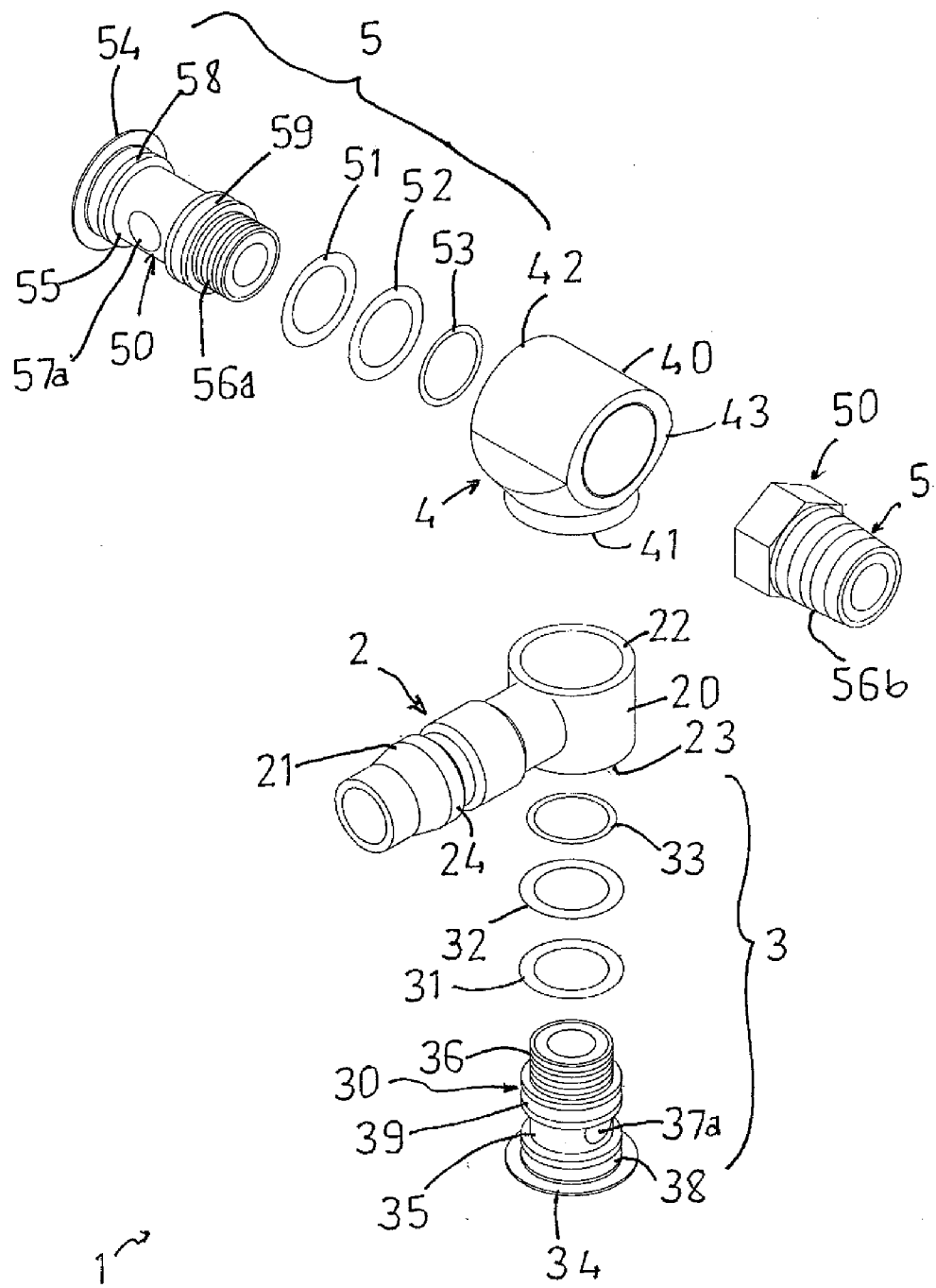
FIG. 3 is another perspective exploded view of the swivel connector shown in FIG. 1.

In the figures, like reference numerals refer to like features.

Figure 4:
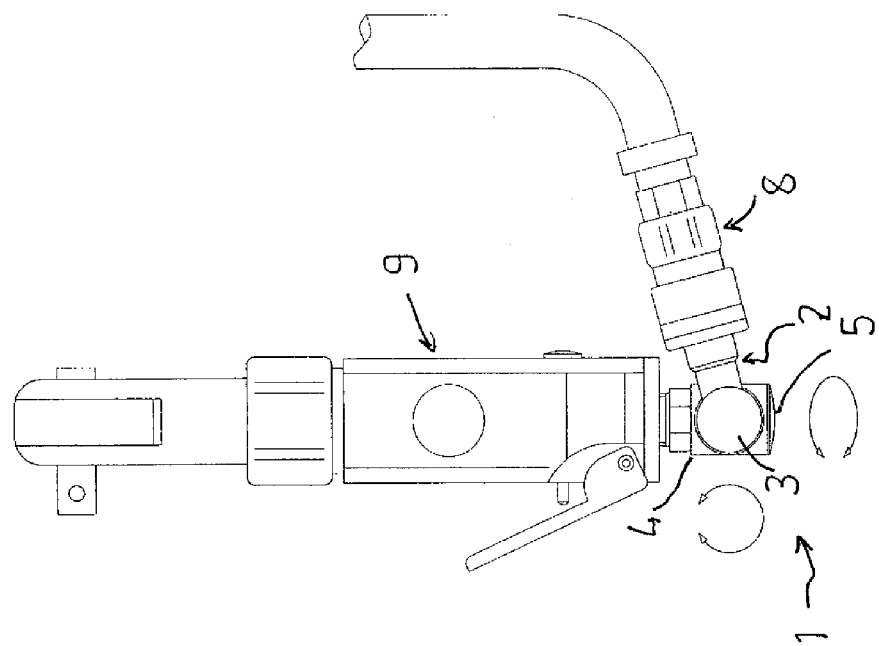
FIG. 4 is a side elevation view of the swivel connector shown in FIG. 1 but connected to an air ratchet tool and high pressure air hose, and showing how the swivel connector can be used to orientate the tool relative to the hose (with the two axes of rotation illustrated)
Figure 5:
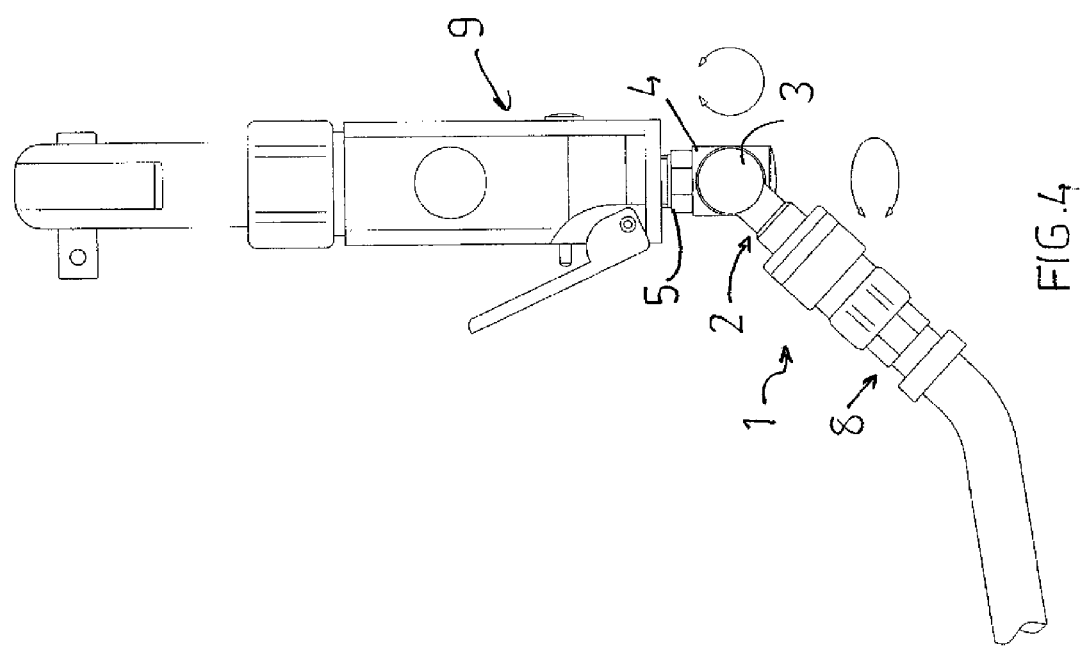
FIG. 5 is the same as FIG. 4 but showing the hose swiveled to a different location.

The figures show a swivel connector 1 for connecting a first fluid line 8 to a second fluid line 9. In a preferred embodiment the first fluid line 8 is an air hose 8 and the second fluid line 9 is a pneumatic tool 9, as seen in FIGS. 4 and 5.

The swivel connector 1 comprises a first banjo 2, a first banjo bolt assembly 3, a second banjo 4 and a second banjo bolt assembly 5.

The first banjo 2 is of unitary construction and comprises a collar 20 and a hollow neck 21 extending laterally from the collar 20 to which is connectable the air hose 8. The collar 20 is tubular and has opposed ends 22, 23. The neck 21 has a barb 24 that enables it to readily couple to the air hose 8 (ie. a quick universal coupling).

The first banjo bolt assembly 3 comprises a banjo bolt 30 and three O-rings 31, 32, 33.

The banjo bolt 30 comprises an enlarged head 34, a hollow shaft 35 extending from the head 34, a threaded connector end 36, and a pair of opposed lateral openings 37a, 37b in the shaft 35.

The banjo bolt 30 extends sealingly through the collar 20 by way of the O-rings 31, 32. A first annular groove 38, provided by a first pair of flanges extending from the shaft 35, extends adjacent the head 34 within which O-ring 31 extends. A second annular groove 39, provided by a second pair of flanges extending from the shaft 35, extends adjacent the threaded connector end 36 within which O-ring 32 extends. That is, O-ring 31 extends around an inner circumference of a first end 23 of the collar 20 and O-ring 32 extends around an inner circumference of a second end 22 of the collar 20.

The threaded connector end 36 is externally threaded. O-ring 33 extends around the threaded connector end 36 so as to provide a fluid-tight seal when the bolt 30 is screwed to the second banjo 4.

The second banjo 4 comprises a collar 40 having opposed ends 42, 43 and a boss 41 having an internally threaded opening. The second banjo 4 comprises a neck extending from the boss 41 laterally of the collar 40 and the neck and the banjo bolt 30/banjo bolt assembly 3 are one and the same. The externally threaded connector end 36 of the bolt 30 is releasably screwed to the internally threaded boss 41.

The second banjo bolt assembly 5 comprises a banjo bolt 50 and three O-rings 51, 52, 53.

The banjo bolt 50 comprises an enlarged head 54, a hollow shaft 55 extending from the head 54, a two-piece threaded connector end 56a, 56b, and a pair of opposed lateral openings 57a, 57b in the shaft 55.

The banjo bolt 50 extends sealingly through the collar 40 by way of the O-rings 51, 52. A first annular groove 58, provided by a first pair of flanges extending from the shaft 55, extends adjacent the head 54 within which O-ring 51 extends. A second annular groove 59, provided by a second pair of flanges extending from the shaft 55, extends adjacent the threaded connector end 56a within which O-ring 52 extends. That is, O-ring 51 extends around an inner circumference of a first end 42 of the collar 40 and O-ring 52 extends around an inner circumference of a second end 43 of the collar 40.

The threaded connector end 56a, 56b comprises an interchangeable hollow threaded adaptor piece 56b screwed to connector end 56a. Adaptor piece 56b can be replaced by other adaptors for connection to pneumatic tools having inlets of varying diameter. Adaptor piece 56b has an internal thread within its hexagonal head for screwing to externally threaded end 56a and an external thread for screwing to a pneumatic tool 9. O-ring 53 extends around the connector end 56a so as to provide a fluid-tight seal when ends 56a and 56b are screwed together.

In order to assemble the swivel connector 1 the second banjo bolt 50 minus adaptor piece 56b but complete with O-rings 51-53 is extended sealingly through the collar 40 of banjo 4 such that the connector end 56a of the bolt 50 extends from the collar 40. Adaptor piece 56b is then tightly screwed to end 56a using a wrench by way of holding bolt 50 fast with a tool (rod or shaft) that is extended through the opening in the boss 41 and the opposed openings 57*a*, 57*b* that are axially aligned with boss 41.

The first banjo bolt 30 complete with O-rings 31-33 is extended sealingly though the collar 20 such that the connector end 36 extends from the collar 20 and the opposed shaft openings 37*a*, 37*b* axially align with the hollow neck 21. The neck and the banjo bolt 30/banjo bolt assembly 3 is then tightly screwed to the boss 41 by way of holding bolt 30 fast with a tool (rod or shaft) that is extended through the neck 21 and the opposed openings 37*a*, 37*b* of the bolt 30 that are axially aligned with the hollow neck 21. The neck 21 together with the banjo bolt 30 are rotated relative to the boss 41 until the banjo bolt 30 and boss 41 are tightly screwed together.

In use, end 21 is coupled with an air hose 8 and end 56*b* is screwed to an inlet of an air powered tool 9 (like an air ratchet) such that pressurized air can flow through the hollow neck 21, within an annular space between the shaft 35 and the collar 20 and between the O-rings 31 and 32, through the shaft openings 37*a*, 37*b*, within the shaft 35, within an annular space between the shaft 55 and the collar 40 and between the O-rings 51 and 52, through the shaft openings 57*a*, 57*b*, within the shaft 55, and out end 56*b*.

As seen in FIGS. 4 and 5, the banjo 2 can swivel/rotate (360 degrees) about the banjo bolt assembly 3, and banjo 4 can swivel/rotate (360 degrees) about the banjo bolt assembly 5.

An advantage of the swivel connector as exemplified is that it can be of smaller overall size than known commercial alternatives due to the way in which the banjos are connected together (using a threaded connection) and also due to the fact that the first banjo is of unitary construction.

Another advantage of the swivel connector as exemplified is that pressurized air is contained between the O-rings of the banjos and banjo assemblies, and thus there is no lateral loading during operation. On the other hand, swivel connectors utilizing a ball bearing mechanism to connect two banjo-like bodies together have the problem that they can lock up during operation when placed under lateral load. Also, since pressurized air can contain moisture, the ball bearing mechanism can rust and seize up.

Yet another advantage of the swivel connector as exemplified is that is does not utilize locking pins nor circlips for locking the banjos and banjo bolt assemblies in place. Hence, unlike the instant invention, they are more difficult to assemble and may not be able to be disassembled.

Although a pneumatic application for the swivel connector has been described it is to be understood that it may have hydraulic applications as well.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

Any reference to a publication cited in this specification is not an admission that the disclosure constitutes common general knowledge.

What is claimed is:

1. A swivel connector comprising:
a first banjo comprising a first collar and a first neck extending laterally from the first collar to which is connectable a first fluid line;
a first banjo bolt assembly comprising a first banjo bolt that extends sealingly through the first collar such that a threaded connector end of the first banjo bolt extends from the first collar and the first banjo is rotatable about the first banjo bolt;
a second banjo comprising a second collar and a second neck extending laterally from a threaded opening in the second collar, wherein the second neck and the first banjo bolt assembly are one and the same and the threaded connector end of the first banjo bolt is screwed to the threaded opening; and
a second banjo bolt assembly comprising a second banjo bolt that extends sealingly through the second collar such that a connector end of the second banjo bolt extends from the second collar and the second banjo is rotatable about the second banjo bolt, wherein the connector end of the second banjo bolt is connectable to a second fluid line such that fluid can flow within the swivel connector in a fluid-tight manner between the first and second fluid lines.

2. The swivel connector of claim 1, wherein the threaded connector end of the first bolt is externally threaded and the threaded opening in the second collar is internally threaded.

3. The swivel connector of claim 1, wherein the first banjo bolt assembly comprises a first annular sealing member extending around an inner circumference of a first end of the first collar and a second annular sealing member extending around an inner circumference of a second end of the first collar.

4. The swivel connector of claim 3, wherein the first banjo bolt comprises an enlarged head, a hollow shaft extending from the head, the threaded connector end, and a pair of opposed lateral openings in the shaft.

5. The swivel connector of claim 4, wherein the first banjo bolt comprises a first annular groove extending adjacent the head within which extends the first annular sealing member, and a second annular groove extending adjacent the threaded connector end within which extends the second annular sealing member.

6. The swivel connector of claim 5, wherein the first banjo bolt assembly comprises a further annular sealing member extending around the threaded connector end so as to provide a fluid-tight seal when the first bolt is screwed to the threaded opening in the second collar.

7. The swivel connector of claim 1, wherein the second banjo bolt assembly comprises a first annular sealing member extending around an inner circumference of a first end of the second collar and a second annular sealing member extending around an inner circumference of a second end of the second collar.

8. The swivel connector of claim 7, wherein the second banjo bolt comprises an enlarged head, a hollow shaft extending from the head, the connector end to which is connectable the second fluid line, and a pair of opposed lateral openings in the shaft.

9. The swivel connector of claim 8, wherein the second banjo bolt comprises a first annular groove extending adjacent the head within which extends the first annular sealing member, and a second annular groove extending adjacent the connector end within which extends the second annular sealing member.

10. The swivel connector of claim 8, wherein the connector end of the second banjo bolt comprises a hollow threaded adaptor piece detachable from a remainder of the connector end, for connection to a said second fluid line of varying diameter.

11. The swivel connector of claim 10, wherein the second banjo bolt assembly comprises a further annular sealing member extending between the detachable adaptor piece and the remainder of the connector end.

12. The swivel connector of claim 1, wherein the first collar and first neck are of unitary construction.

13. The swivel connector of claim 1, wherein the first neck is shaped for connection to a said first fluid line selected from the group consisting of a hose and a pipe.

14. The swivel connector of claim 1, wherein the connector end of the second banjo bolt is threaded for connection to said second fluid line in the form of a pneumatic tool.

* * * * *